Oct. 11, 1932.  R. GOOD  1,882,076
PNEUMATIC GLASS FEEDER
Filed April 1, 1927  2 Sheets-Sheet 1
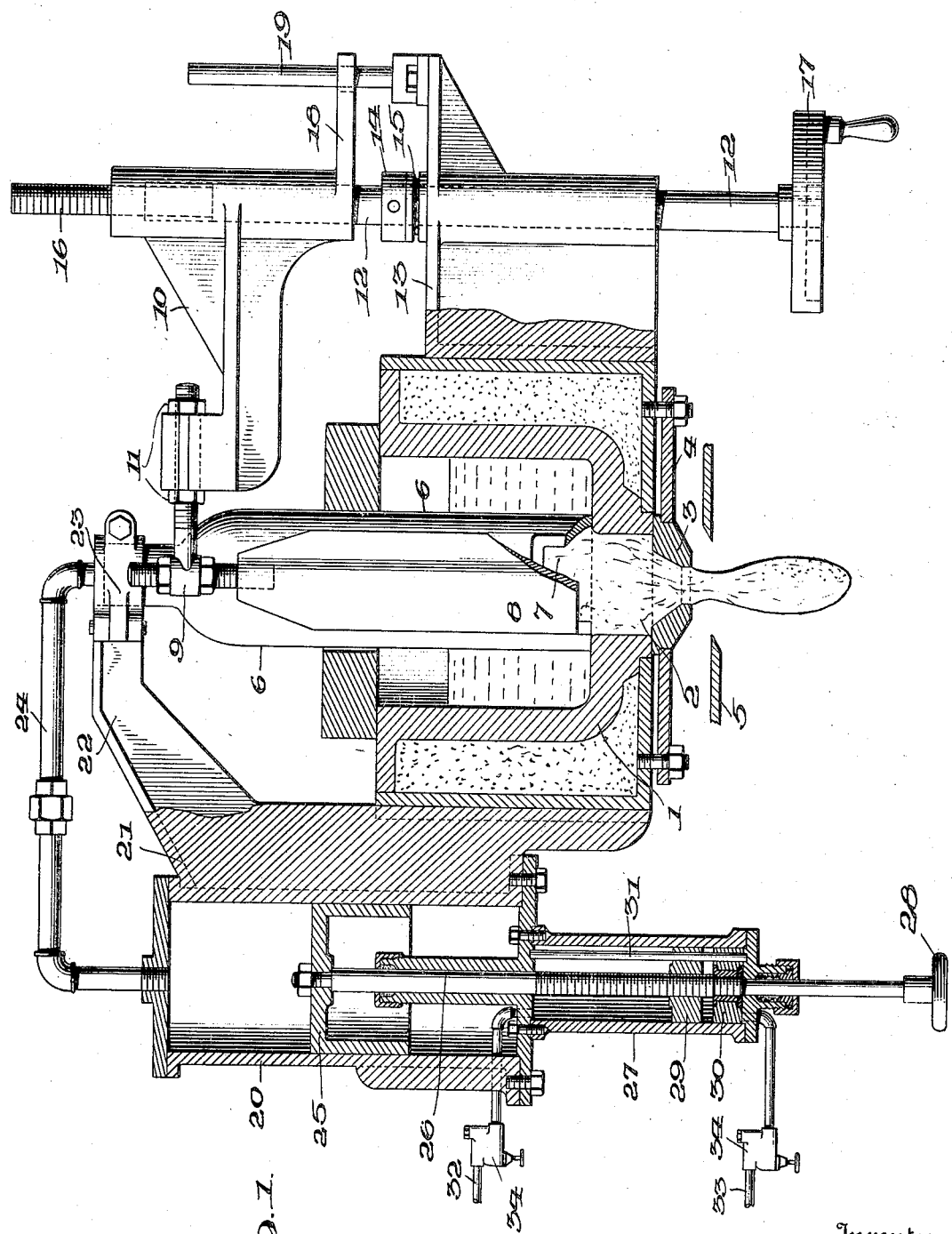
Inventor
Robert Good,
By Eccleston & Eccleston
Attorney

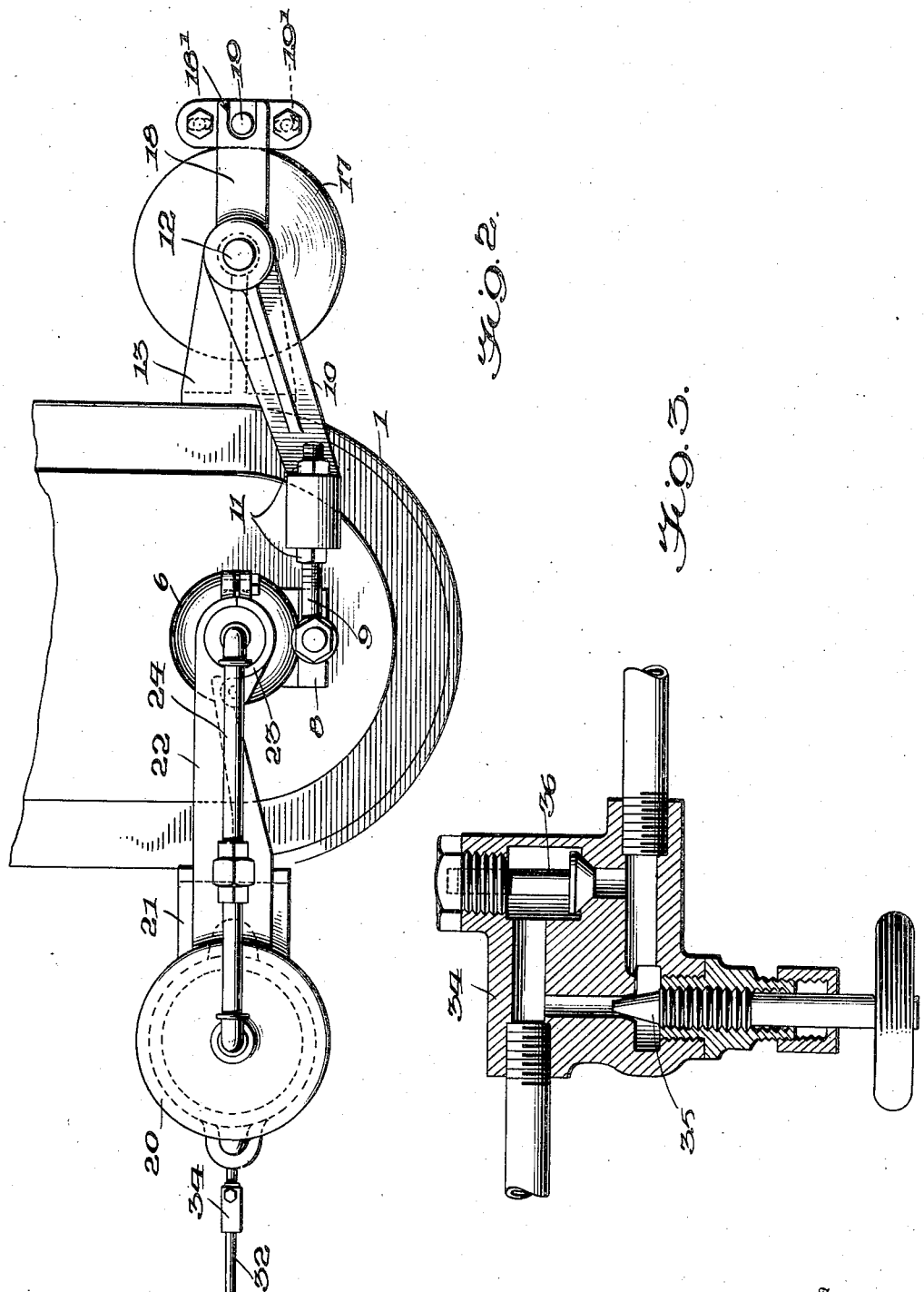

Patented Oct. 11, 1932

1,882,076

UNITED STATES PATENT OFFICE

ROBERT GOOD, OF WASHINGTON, PENNSYLVANIA, ASSIGNOR TO HAZEL-ATLAS GLASS CO., OF WHEELING, WEST VIRGINIA, A CORPORATION OF WEST VIRGINIA

PNEUMATIC GLASS FEEDER

Application filed April 1, 1927. Serial No. 180,281.

The invention relates to that type of glass feeders in which the charges are formed and severed while suspended below the flow orifice of the flow spout.

Suspended gob feeders may be divided into two general classes; that type in which the glass is controlled by some reciprocable or otherwise movable element; and that type in which the glass is controlled by variations of air pressure. The present invention relates to improvements in the latter type of feeder.

The construction and operation of the feeder, together with the advantages thereof, will be apparent to those skilled in the art, from the following detailed description when taken in connection with the accompanying drawings; in which Figure 1 is a front view of the feeder, with parts in section, and parts broken away, to more clearly show the construction.

Figure 2 is a plan view of the feeder; and

Figure 3 is a detail sectional view of one of the valves.

Referring to the drawings more in detail, numeral 1 indicates a conventional flow spout having the usual flow orifice 2, below which is arranged the variable bushing 3, which is removably secured in place by any suitable means, such as indicated by numeral 4. The usual shears 5 are provided below the flow orifice to sever the formed charges, which then fall into the molds of forming machines. The structure thus far described is well known in the glass industry, and is common to practically every glass feeder.

Mounted in the flow spout over the flow orifice is what may be termed an impulse bell, indicated by numeral 6 and preferably made of fire clay. The air in the upper portion of the bell, above the glass, is alternately compressed and rarefied, thereby controlling the flow of glass in a manner to be described hereinafter. It is to be particularly noted that the lower end of the impulse bell is seated on the floor of the flow spout and always remains seated thereon; there being no movement imparted to the bell and there being no adjustment thereof.

For the purpose of permitting glass to flow from the spout into the bell, I have provided the lower end of the bell with an inlet port or opening 7. This opening is shown at the lower end of the bell, and that is the preferable location, but obviously it may be arranged anywhere in the bell, provided it is below the level of the glass. In this present preferred form, the opening 7 is on the side of the bell away from the tank. And I find this to be the best location, for the glass must flow around the bell in order to reach the inlet, and this results in a more uniform temperature; but it will be understood, of course, that the inlet may be arranged as desired. It will also be understood that different sizes of bells having larger or smaller inlets, may be employed for different work, or in different installations.

For controlling and regulating the effective size of the inlet port 7, I provide an adjustable gate 8, which fits tightly against the face of the port 7, and is held thereagainst by the pressure of the glass. If desired, additional means may be employed for holding the gate tightly against the opening, but in actual practice I do not find such means to be necessary.

It will be understood, of course, that any desired means may be employed for vertically adjusting the gate, and the particular means that I employ, and which I will now describe, are to be considered merely as an example of a convenient mode of regulating the gate.

The upper end of the gate 8 is attached to and carried by a horizontal rod 9 which is adjustably mounted in a bracket 10 by means of nuts 11, 11. By adjusting the nuts 11, 11, the gate may be adjusted laterally to suit different installations. A vertical shaft 12 is mounted for rotation in a bracket 13 attached to the nose casing. A collar 14 is attached to the shaft above the bracket 13, and an anti-friction bearing 15 is arranged between the collar and the bracket, whereby the shaft is rotatably supported by the bracket. The upper end of the shaft 12 is threaded, as indicated by numeral 16, and the shaft is rotated by any desired means, such as the hand wheel 17. The bracket 10 is cored to fit down over the shaft 12, and the upper portion of the core is threaded to engage the threaded upper end of the shaft 12. Thus by the rotation of the shaft 12 in the proper direction the gate may be raised or lowered to the desired extent, giving a very delicate adjustment. The lower portion of the bracket 10 is provided with a laterally extending arm 18 having its end forked as indicated by numeral 18' to receive a vertical pin or rod 19, which prevents the bracket 10 from turning when the shaft 12 is rotated. The pin or rod 19 is rendered laterally adjustable by any desired means, such as slots 19', whereby the gate 8 may be adjusted to different sized impulse bells, and also to adapt it to different installations.

It will be understood that the gate is adjusted up or down to regulate the size of the entrance 7, thus regulating the flow of glass into the impulse bell, and thus regulating the weight of the formed suspended glass charges.

The life of the fire clay feeder elements formerly employed is relatively short; the life being shortened by reason of the movements and adjustments that must be given to such elements. The less movement and the less adjustment that must be given to these fire clay elements, the longer is the life of such elements. And it will be noted that in my present feeder all movement and nearly all adjustment is eliminated. The impulse bell has no reciprocatory or other movement, and no adjustment; it remaining in fixed position resting on the floor of the flow spout. Likewise the gate 8 has no reciprocating or other feeder movement, but has merely slight vertical adjustment to regulate the size of the entrance port 7.

The means for alternately applying a positive and negative pressure on the surface of the glass in the bell, will now be described.

It will be understood that when pressure is applied to the surface of the glass in the bell it will assist gravity in expelling the glass through the flow orifice, and when the pressure on this surface is reduced by rarefying the air, the partial vacuum will act against gravity to retard the flow of glass, whereby the glass is necked-in below the orifice. The charge is severed at this necked-in portion and drops into the mold, whereupon the partial vacuum acts to draw the stub upwardly through the flow orifice into the body of glass in the flow spout. All of this operation is well known and needs no extended description.

But the function of a glass feeder by no means resides merely in expelling charges and retracting the stub; one of the essential requisites of a successful commercial feeder being its capability of shaping the suspended gobs to suit various conditions and requirements. In the present feeder I am able to accurately control and change the shape of the gobs by an extremely simple mechanism.

Numeral 20 indicates a cylinder which is preferably carried by a bracket 21 attached to the nose casing; which bracket is shown as provided with a laterally extending arm 22, carrying at its end a coupling 23 which is adapted to be clamped about the upper end of the impulse bell 6 to hold it securely in fixed position. The interior of the bell is at all times in direct communication with the interior of the cylinder 20, by means of an ordinary pipe connection 24, which is entirely free of valves. The cylinder 20 may be termed the impulse cylinder, in that its function is to alternately compress and rarefy the air in the impulse bell 6, whereby the necessary impulses are imparted to the glass.

For this purpose, the cylinder 20 is provided with a piston 25, which upon its upward movement forces the air from the upper portion of the impulse cylinder into the upper portion of the impulse bell, thereby compressing the air; and which upon the reverse or downward movement withdraws the air from the upper portion of the impulse bell into the upper portion of the impulse cylinder, thereby rarefying the air. The piston 25 is carried by a piston rod 26 which passes on downwardly into and entirely through an actuating cylinder 27; the lower end of the piston rod that projects below the actuating cylinder being provided with a hand wheel 28, for rotating the piston rod 26 for a purpose to be now described. For the purpose of reciprocating the piston rod, I mount thereon, within the actuating cylinder, two pistons, 29 and 30. The piston 30 is swiveled on the piston rod 26, while the piston 29 is threaded thereon. A rod 31 is socketed in the cylinder heads of cylinder 27 and passes through pistons 29 and 30 preventing the rotation of the pistons when the piston rod is rotated. The piston rod is rotated by the hand wheel 28, and it is apparent that when the rod is rotated the piston 29 will be adjusted upwardly or downwardly through its threaded engagement with the piston rod, and thereby either increasing or decreasing the length of the piston stroke.

This regulation of the upper limit of stroke of the actuating piston, thereby regulating the upper limit of stroke of the impulse piston, is one of the means by which I am able to control the shape of the suspended gobs, particularly the length thereof. It is apparent that if the impulse piston is traveling to its upper limit on every stroke, that the maximum impelling and retracting forces will be imparted to the glass in the bell, and that these forces are lessened when the upper limit of the piston stroke is lowered. By this simple regulation of the upper limit of the piston stroke, by the rotation of the hand wheel 28, I am able to very accurately control the length of the charges, and without varying the weight thereof.

An air line 32 leads to the upper end of actuating cylinder 27, and a similar line 33 leads to the lower end thereof. Air is alternately supplied to and exhausted from opposite ends of the actuating cylinder, in the well known manner, to reciprocate the piston rod 26. I have not deemed it to be necessary or desirable to disclose the valves for controlling the alternate admission and exhaust at opposite ends of the actuating cylinder, or the timing mechanism by means of which such valves are operated at the desired times and in the desired relation. It is sufficient to state that such valves and the timing mechanism therefor have been known and have been in common use in the operation of glass feeders, and other glass machinery for many years. The same is true, of course, in regard to the valves and timing mechanism for operating the shears 5.

In each of the lines 32 and 33, I provide a valve 34. This valve is of the combined needle and check type, as clearly shown in Figure 3. Its construction involves no novelty and its principle is well known to the art, but by its use here I am able to operate the feeder in such manner as to accurately control the shape of the glass charges, as will now be described.

The shape of the suspended gob is controlled to a large extent by the speed of the up stroke of the piston, or by the speed of the down stroke thereof. And it is apparent that to obtain the best results it should be possible to change the speed of the up stroke without changing the speed of the down stroke, and vice versa. Now by reference to Fig. 3, it will be understood that by adjusting the needle valve 35, the admission of air is regulated, but there remains a free exhaust of air through the check valve 36. Thus if the needle valve in the line 33 is opened wider the speed of the up stroke will be greater, and if it be closed somewhat then the speed of up stroke will be less; but in either case the speed of the down stroke will remain unchanged, for there is always the free exhaust through the check valve 36. On the other hand, if the needle valve in the line 32 is opened wider the speed of the down stroke will be greater, and if it be closed somewhat then the speed of the down stroke will be less, but in either case the speed of the up stroke will remain unchanged, for there is always the free exhaust through the check valve 36. It is thus apparent that by this simple mechanism I am able to vary the speed of down stroke without varying the speed of up stroke, or vice versa, and needless to say, I can also vary both the speed of up stroke and down stroke. By these adjustments the suspended gobs or charges may be given any desired shape to suit requirements, and the length of the gobs may be further controlled by adjusting the upper limit of the piston stroke, all of which may be accomplished without varying the weight of the charges; the weight of the charges being controlled and regulated by the adjustment of the gate 8.

While I have described the needle valve as controlling the admission of air, and the check valve permitting a free exhaust, it will be apparent that the valves may be reversed in the line, whereby there will be a free admission of air but a controlled exhaust thereof; that is, the exhaust may be throttled or checked. The result will be the same, in that the speed of the up stroke may be varied without varying the speed of the down stroke, and vice versa.

While I have described a specific means for adjusting the upper limit of the piston stroke, it will be understood that the invention contemplates the use of any desired means for accomplishing this function. However, I prefer the illustrated means, for it is apparent that it is economical in the use of air, in that the amount of air employed is reduced as the length of stroke is reduced.

Obviously the invention is subject to numerous modifications and changes, all of which I aim to include in the scope of the appended claims.

What I claim is:

1. A glass feeder including a flow spout having a flow orifice, an impulse bell mounted on the floor of the flow spout over the flow orifice, the lower portion of said bell provided with an inlet, a gate for regulating the effective size of said inlet, and means for alternately compressing and rarefying the air in the upper portion of said impulse bell.

2. A glass feeder including a flow spout having a flow orifice, an impulse bell mounted in fixed relation on the floor of the flow spout over the flow orifice, the lower end of said bell having an inlet, a gate cooperating with said inlet, means for adjusting said gate for adjusting the effective size of said opening, means for alternately compressing and rarefying the air in the upper portion of the impulse bell, and means below the flow orifice for severing the formed charges.

3. A glass feeder including a spout having a flow orifice, an impulse bell mounted in said flow spout over said flow orifice and in fixed relation thereto, said bell having an inlet port permitting the glass to flow from the flow spout into the bell, a gate for said inlet, means for adjusting said gate to vary the effective size of said inlet, and means for alternately compressing and rarefying the air in the upper portion of the bell.

4. A glass feeder including a flow spout having a flow orifice, an impulse bell fixedly mounted on the floor of the flow spout over the flow orifice, said bell provided with an inlet adjacent its lower end, a gate cooperating with said inlet, means for vertically adjusting said gate to vary the effective size of said inlet, means for laterally adjusting said gate, and means for alternately compressing and rarefying the air in the upper portion of said bell.

5. A glass feeder including a flow spout having a flow orifice, an impulse bell fixedly mounted on the floor of the flow spout over the flow orifice, said bell provided with an inlet adjacent its lower end, a gate cooperating with said inlet, means for adjusting the gate to vary the effective size of the inlet, an air pump communicating with the upper end of the impulse bell, and means for varying the speed of the pump piston stroke, for the purpose described.

6. A glass feeder including a flow spout having a flow orifice, an impulse bell fixedly mounted on the floor of the flow spout over the flow orifice, said bell provided with an inlet adjacent the lower end, a gate cooperating with said inlet, means for adjusting the gate for varying the effective size of the inlet, an air pump communicating with the upper end of the impulse bell, means for varying the speed of the pump piston stroke in one direction without varying the speed thereof in the opposite direction, for the purpose described.

7. A glass feeder including a flow spout having a flow orifice, an impulse bell arranged in the spout over the orifice, a reciprocable plunger pump for alternately compressing and rarefying the air in the impulse bell, a fluid pressure motor for actuating the pump, a pipe adjacent each end of the motor for supplying and exhausting air pressure, and means for varying the supply to one end of the motor without affecting the exhaust from the same end of the motor.

8. A glass feeding machine including in combination a pouring nozzle, a fixed baffle surrounding said nozzle and having an opening remote from the main body of the machine, and a sliding gate adapted to control said opening.

9. A glass feeder including a flow spout communicating with a furnace, the flow spout having a flow orifice in the bottom thereof, a fixed impulse bell projecting downwardly into the glass in the flow spout in alignment with the flow orifice, said bell having an opening facing away from the furnace, and means for varying the size of said opening.

10. A glass feeder including a flow spout having a flow orifice, an impulse bell mounted on the floor of the flow spout over the orifice, the wall of said bell provided with an inlet for the glass, and means for varying the size of said inlet.

ROBERT GOOD.